United States Patent [19]

Syamal

[11] Patent Number: 5,290,079
[45] Date of Patent: Mar. 1, 1994

[54] REINFORCED COMPOSITE IMPACT BEAM FOR A BUMPER ASSEMBLY AND METHOD

[75] Inventor: Pradip K. Syamal, West Bloomfield, Mich.

[73] Assignee: General Motors Corporation, Detroit, Mich.

[21] Appl. No.: 994,151

[22] Filed: Dec. 22, 1992

[51] Int. Cl.⁵ .............................................. B60R 19/03
[52] U.S. Cl. ................................. 293/120; 293/122; 264/257
[58] Field of Search ............... 293/120, 121, 122, 133, 293/132; 264/257

[56] References Cited

U.S. PATENT DOCUMENTS

| | | | |
|---|---|---|---|
| 3,809,420 | 5/1974 | Weller | 293/70 |
| 3,852,150 | 12/1974 | Weller | 293/120 X |
| 4,061,384 | 12/1977 | Montgomery et al. | 293/120 |
| 4,076,296 | 2/1978 | Ditto et al. | 293/122 |
| 4,391,464 | 7/1983 | Masotti et al. | 293/120 |
| 4,545,105 | 10/1985 | Kowalsky | 29/469.5 |
| 4,940,270 | 7/1990 | Yamazaki et al. | 293/122 |
| 5,141,273 | 8/1992 | Freeman | 293/122 |
| 5,219,197 | 6/1993 | Rich et al. | 293/120 |

FOREIGN PATENT DOCUMENTS 4-201753 7/1992 Japan .................... 293/120

Primary Examiner—Robert R. Song
Attorney, Agent, or Firm—A. Michael Tucker

[57] ABSTRACT

A rear composite impact beam includes front, rear, top and bottom walls formed from glass fibers encapsulated by a resin. Longitudinal ductile reinforcing members are provided at the intersections of the front wall with the top and bottom walls to enhance flexural strength in a region of the impact beam which receives predominantly tension loads during impact. If desired, similar longitudinal ductile reinforcing members are provided at the intersections of the rear wall with the top and bottom walls and retained by the resin to enhance flexural strength at a region of the impact beam which receives predominately compression loads during impact. If desired, a reinforcing web of woven ductile strands can be provided in at least the rear wall and encapsulated by the resin.

16 Claims, 2 Drawing Sheets

REINFORCED COMPOSITE IMPACT BEAM FOR A BUMPER ASSEMBLY AND METHOD

BACKGROUND OF THE INVENTION

1. Field of the Invention

The present invention relates generally to automotive bumpers, and in particular is concerned with a reinforced composite impact beam for a soft bumper assembly.

2. Description of the Related Art

Soft bumper systems for both front and rear ends of automobiles are well-known. Generally, an impact beam or bar is mounted to the frame or support structure with brackets and fasteners or other suitable means. Impact beams are designed to resist deformation during impact, and reduce damage to the body and other components. Oftentimes, an energy-absorbing medium, e.g., compressible foam or collapsible cellular units, is mounted on an outer face of an impact beam to absorb energy imparted by a collision. A fascia, formed from a pliable material, is fitted over the energy-absorbing medium to provide an attractive outer cover for the bumper system.

Various cross sections and materials are used for impact beams. Some cross sections are open due to a C-shaped beam, while others are closed with a box-shaped beam. Some impact beams are formed from thin gauge metals and alloys to reduce weight and provide effective deformation resistance. Other impact beams are formed from high-strength, moldable composite materials such as resin reinforced with glass fibers to form a laminate. However, glass fiber reinforcements alone have not satisfactorily sustained impact loads once a crack develops in the laminate.

The art continues to seek improvements. It is desirable to provide a deformation-resistant impact beam having the least mass possible to reduce the cost of the impact beam and to enhance fuel efficiency of a vehicle. Furthermore, it is desirable to provide an economical means to reinforce an impact beam, particularly an impact beam formed from moldable composite materials.

SUMMARY OF THE INVENTION

The present invention includes a high strain/high modulus reinforced composite impact beam for an automotive soft bumper system. The impact beam includes longitudinal ductile strips in a region of the impact beam which receives tension loads during impact. If preferred, longitudinal ductile strips are provided in a region of the impact beam which receives compression loads during impact. Also, a reinforcing web of woven strands can be encapsulated along with glass fibers by a resin. The present reinforced impact beam improves the ductility and flexural strength of a composite beam without adding substantial mass. The longitudinal reinforcing members and the web can be used with conventional tooling to form a reinforced bumper in a structural reaction injection molding process.

In a preferred embodiment, a rear composite impact beam includes front, rear, top and bottom walls formed from glass fibers encapsulated by a resin. Longitudinal ductile reinforcing members are provided at the intersections of the front wall with the top and bottom walls to enhance flexural strength in a region of the impact beam which receives predominantly tension loads during impact. If desired, similar longitudinal ductile reinforcing members are provided at the intersections of the rear wall with the top and bottom walls and retained by the resin to enhance flexural strength at a region of the impact beam which receives predominately compression loads during impact. If desired, a reinforcing web of woven ductile strands can be provided in at least the rear wall and encapsulated by the resin.

DETAILED DESCRIPTION OF THE PREFERRED EMBODIMENT

Figure 1:
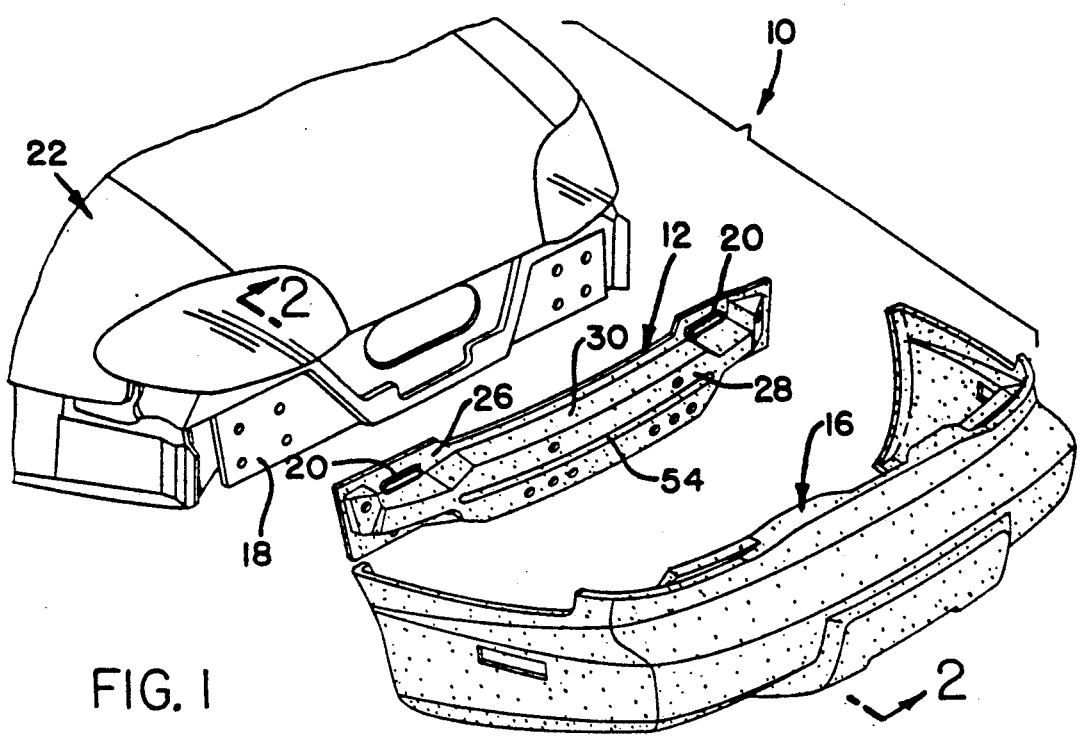
FIG. 1 is an exploded perspective view of a rear bumper system illustrating a preferred embodiment of the present reinforced impact beam between a vehicular body and a fascia.
Figure 2:
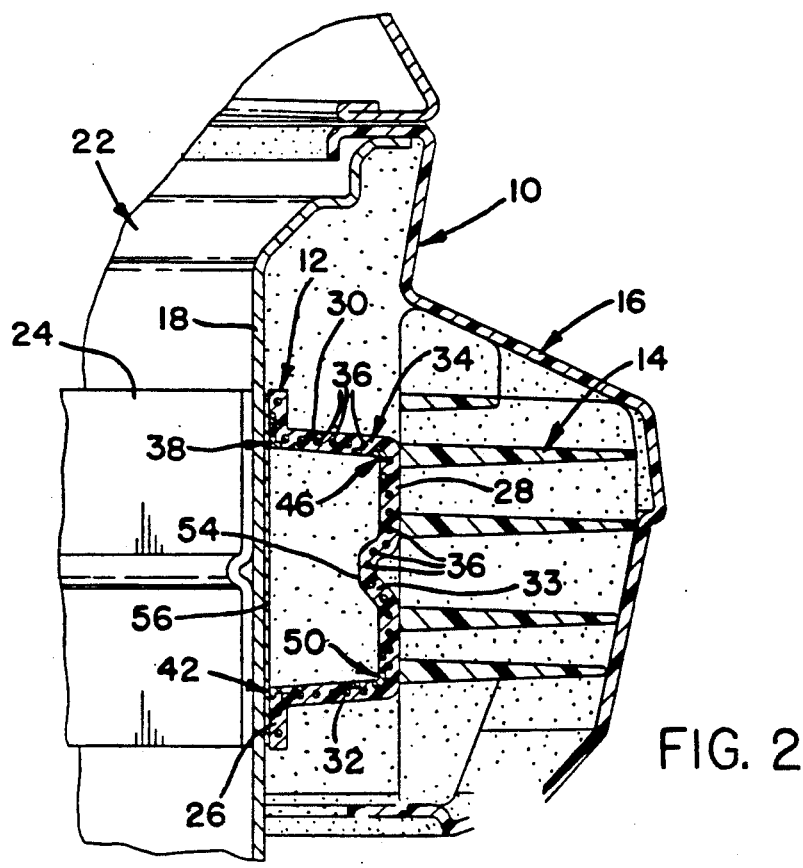
FIG. 2 is a sectional view of the assembled bumper system taken along line 2—2 of FIG. 1 illustrating an energy absorber mounted between the impact bar and the fascia.

An automotive soft bumper system is indicated generally at 10 in FIGS. 1 and 2. The bumper system includes an impact beam 12, an energy absorbing medium 14 and a fascia 16. The impact beam 12 is generally attached to a rear portion of a frame 24 (FIG. 2) by suitable fasteners 20. A rear end panel 18 and a seam plate gasket (not illustrated) are provided between frame 24 and impact beam 12 at a rear portion 22 of a vehicle.

The impact beam 12 is an elongated member which spans a substantial portion of the width of the vehicle. In the embodiment illustrated, the impact beam 12 includes a vertical front wall 26, which is positioned against the rear end panel 18, a laterally spaced vertical rear wall 28, a top wall 30, and a bottom wall 32. While the impact beam 12 has been illustrated with substantially planar walls 26, 28, 30, and 32, curved configurations are within the scope of the present invention. Furthermore, an open cross section resembling a C-shape cross section is formed by the walls 26, 28, 30, and 32 along line 2—2. In other embodiments, various cross sections and wall designs can be adapted for the reinforcing elements described below.

The impact beam 12 is preferably formed from moldable reinforced plastics. Suitable resins and reinforcements (generally glass fibers) are introduced to a mold having a suitable profile. Preferably, mats of glass fibers, such as chopped-strand mats, and woven roving fabrics are used as the reinforcements, and are oftentimes arranged in layers. For purposes of simplified illustrations, the combined resin and glass fiber reinforcement laminate is indicated at 33 in the sectional views of FIGS. 2 and 3. It is desirable to form the impact beam 12 in a structural reaction injection molding (SRIM) process.

Figure 3:
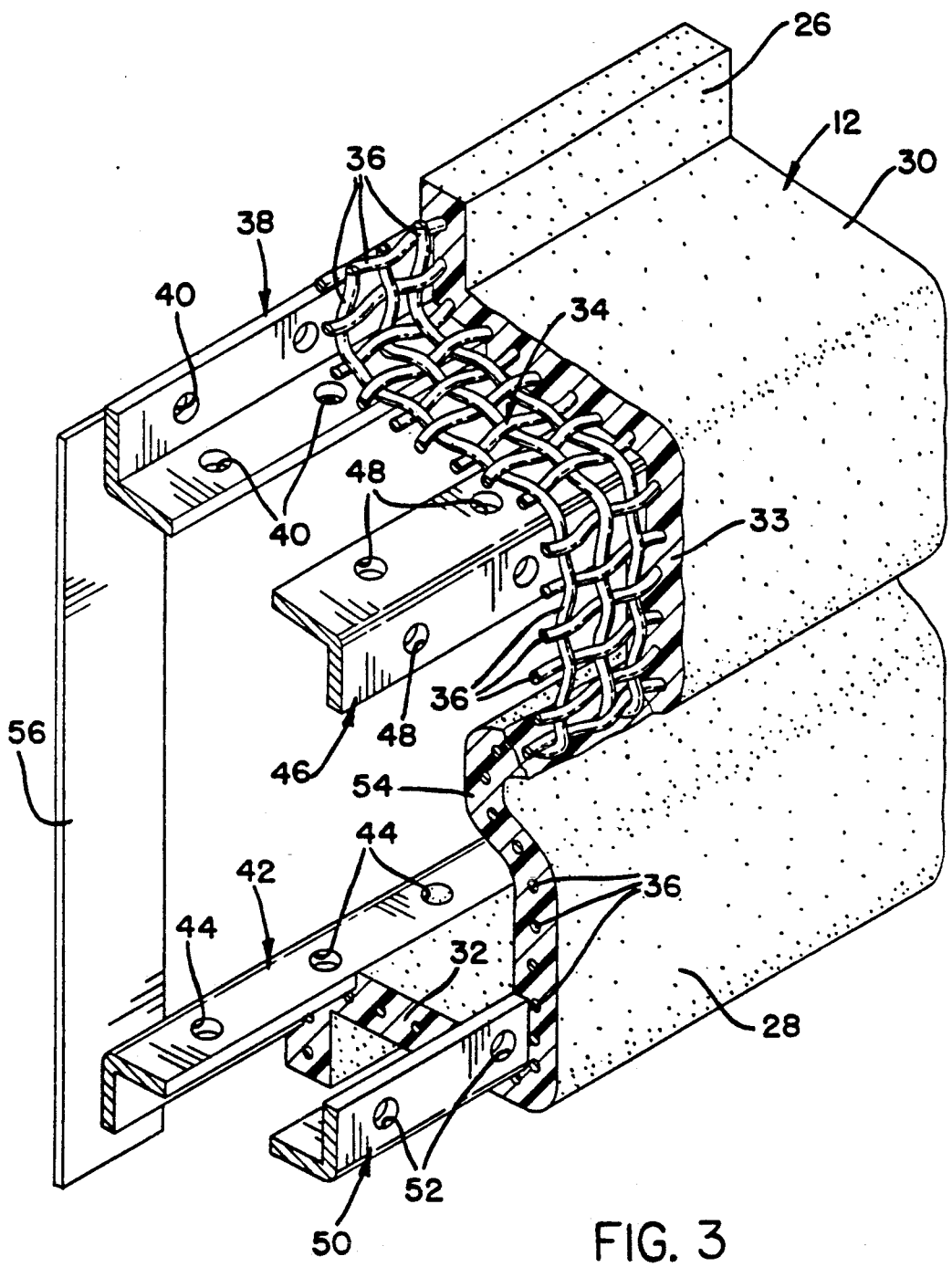
FIG. 3 is an enlarged perspective view of a portion of the impact beam of FIGS. 1 and 2 wherein a fiberglass-reinforced resin laminate has been partially removed to illustrate longitudinal ductile reinforcing members at the intersections of walls of the impact beam as a ductile reinforcing web.

At the corner formed by the intersection of the front wall 26 and the top wall 30, a tension reinforcement strip 38 is preferably provided. The strip 38 is illustrated as an angled or L-shaped thin member spanning the length of the impact beam 12. The strip 38 is made from a suitable ductile metal (such as aluminum, steel, etc.) or nonmetal (such as graphite, KEVLAR, etc.) capable of resisting predominantly tension forces (axial tension and/or bending tension) incurred in the region during impact. Preferably, a plurality of openings 40 are provided along the length of strip 40. A similar tension reinforcement strip 42 is preferably provided at the intersection of the bottom wall 32 and the front wall 26. Preferably, a plurality of openings 44 are provided in the strip 42. In other embodiments, the tension reinforcement members 38, 42 can be formed as thin, flat bars or round bars with indented or deformed surfaces. The strips 38, 42 are preferably placed between the glass mats and encapsulated by the resin of the laminate 33, or the strips 38, 42 can be retained at an outer surface of the laminate 33 as illustrated in FIGS. 2 and 3. The resin of the laminate 33 fills the openings 40, 42 to enhance the bond.

The impact beam 12 preferably includes a reinforcement web 34 made from a ductile metal (steel, aluminum, etc.) or a suitable ductile non-metallic, lightweight, high-strength material (such as graphite, KEVLAR, etc.) in the form of a wire mesh or net. As illustrated best in FIG. 3, the web 34 is formed by weaving strands 36 of the selected material in any suitable pattern, and covers the rear wall 28 and preferably the entire area of the impact beam 12. The web 34 can be a flexible member or can be preformed in a shape resembling the desired shape of the impact beam 12. The web 34 is preferably placed between the glass fiber mats and encapsulated by the resin of the laminate 33.

At the corner formed by the intersection of the top wall 30 and the rear wall 28, a compression reinforcement strip 46 is preferably provided. The strip 46 is illustrated as an angled or L-shaped thin member spanning the length of the impact beam 12. The strip 46 is made from a suitable ductile metal or nonmetal capable of resisting predominately compression forces incurred in the region during impact and includes openings 48 along its length. A similar compression reinforcement strip 50 having openings 52 is preferably provided at the intersection of the rear wall 28 and the bottom wall 32. In other embodiments, the compression reinforcement members 46, 50 can be formed as thin flat bars or round bars with indented or deformed surfaces. The strips 46, 50 are preferably placed between the glass mats and encapsulated along with strips 38, 42 by the resin of the laminate 33, or the strips 46, 50 can be retained at an outer surface of the laminate 33. Openings 48, 52 accept resin and enhance the bond.

If desired, a longitudinal reinforcement rib 54 can be provided in the rear wall 28. The rib 54 can be formed in the web 34 and glass fiber mats prior to the injection of resin into the mold.

If desired, one or more vertical reinforcing straps 56 can be mounted between the top and bottom walls 30, 32 to provide increased stability of the open cross section impact beam 12.

During impact, predominantly tension loads are incurred at the intersections of the front wall 26 and the top and bottom walls 30, 32. The strips 38, 42 enhances the flexural strength and ductility of the impact beam 12 in these regions. Strips 46 and 50 enhances flexural strength and ductility in regions which incur predominantly compression loads, while the web 34 improves these aspects of the entire impact beam 12. While various combinations of the disclosed reinforcement elements are possible, it is preferred to include at least strips 38 and 42 in a composite impact beam 12.

Although the present invention has been described with reference to a preferred embodiment, workers skilled in the art will recognize that changes may be me in form and detail without departing from the spirit and scope of the invention.

The embodiments of the invention in which an exclusive property or privilege is claimed are defined as follows:

1. An automotive impact beam comprising:
   (a) an elongated body having glass fibers encapsulated by a resin to form a laminate; and
   (b) elongated ductile reinforcing means retained by the laminate in a region of the body which incurs predominantly tension loads during impact.

2. The impact beam specified in claim 1 including a reinforcing web of woven ductile strands encapsulated by the laminate.

3. The impact beam specified in claim 1 including elongated ductile reinforcing means retained by the laminate in a region of the body which incurs predominately compression loads during impact.

4. An automotive bumper assembly comprising:
   (a) an impact beam having front wall adjacent a vehicle body, a laterally spaced rear wall, and top and bottom walls formed as a laminate of glass fibers and resin;
   (b) a web of reinforcing ductile strands inserted in at least the rear walls;
   (c) energy absorber means mounted on the impact beam; and
   (d) a fascia covering the energy absorber means.

5. The assembly specified in claim 4 including a longitudinal ductile reinforcing tension member inserted in the impact beam at least in the intersection of the front and top walls.

6. The assembly specified in claim 5 wherein the reinforcing member has an angled cross section.

7. The assembly specified in claim 4 including a longitudinal ductile reinforcing tension member inserted in the impact beam at least in the intersection of the front and bottom walls.

8. The assembly specified in claim 7 wherein the reinforcing member has an angled cross section.

9. The assembly specified in claim 4 including a longitudinal ductile reinforcing compression member inserted in the impact beam at least in the intersection of the top and rear walls.

10. The assembly specified in claim 9 wherein the reinforcing member has an angled cross section.

11. The assembly specified in claim 4 including a longitudinal ductile reinforcing compression member inserted in the impact beam at least in the intersection of the bottom and rear walls.

12. The assembly specified in claim 11 wherein the reinforcing member has an angled cross section.

13. The assembly specified in claim 4 including at least one vertical strap mounted between the top and bottom walls.

14. The assembly specified in claim 4 wherein a longitudinal rib is formed in the rear wall.

15. A method of forming an automotive impact beam, comprising the steps of:
   (a) forming a closable mold having a cavity for an elongated beam including front, rear, top and bottom walls;
   (b) inserting layers of glass fibers in the mold at least along the top and bottom walls;

(c) inserting ductile reinforcing means in the region of the intersections of the rear wall with the top and bottom walls;
(d) inserting ductile reinforcing means in the region of the intersections of the front wall with the top and bottom walls;
(e) closing the mold; and
(f) injecting a resin into the closed mold to encapsulate the glass fibers and web.

16. The method specified in claim 14 including the steps of inserting a web of ductile reinforcing strands in the mold along the walls of the mold prior to closing the mold.

* * * * *